(12) United States Patent
Tsai

(10) Patent No.: US 6,425,089 B1
(45) Date of Patent: Jul. 23, 2002

(54) METHOD FOR GENERATING A CLOCK SIGNAL FOR UNIVERSAL ASYNCHRONOUS RECEIVER TRANSMITTER BY UTILIZING A PCI-STANDARDIZED CLOCK SIGNAL

(75) Inventor: Hsi-Jung Tsai, Hsinchu Hsien (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/299,718

(22) Filed: Apr. 26, 1999

(30) Foreign Application Priority Data

Mar. 19, 1999 (TW) ........................ 88104318 A

(51) Int. Cl.[7] .............................. G06F 1/08; G06F 1/12
(52) U.S. Cl. ........................ 713/500; 327/291; 713/400
(58) Field of Search ........................... 713/500–503, 713/400; 327/291

(56) References Cited

U.S. PATENT DOCUMENTS

| | | | |
|---|---|---|---|
| 4,204,207 A | * 5/1980 | Bakula et al. | 345/141 |
| 4,377,843 A | * 3/1983 | Garringer et al. | 710/71 |
| 5,241,647 A | * 8/1993 | Lin et al. | 713/501 |
| 5,588,145 A | * 12/1996 | Wishneusky | 713/500 |
| 6,298,370 B1 | * 10/2001 | Tang et al. | 709/102 |

* cited by examiner

*Primary Examiner*—Thomas Lee
*Assistant Examiner*—Ilwoo Park
(74) *Attorney, Agent, or Firm*—J.C. Patents

(57) ABSTRACT

A method is provided for use on a PCI-compliant (Peripheral Component Inter-connection) interface card having a UART (Universal Asynchronous Receiver-Transmitter) unit to generate a near-1.8432 MHz clock signal for clocking the UART unit. This method includes a first step of dividing a selected PCI clock signals, such as the 33 MHz PCI clock signal, from the PCI local bus by a predetermined integer frequency divisor; and a second step of multiplying the resulted frequency from the division by a predetermined integer frequency multiplier that allows the resulted frequency to be substantially close to 1.8432 MHz to serve as the intended clock signal to the UART unit. Preferably, the integer frequency multiplier is in the range equal to or greater than 8. This method can generate a more precise clock signal for the UART unit on the PCI-compliant interface card without having to use an external crystal oscillator. Moreover, the method requires only a frequency divider without a frequency multiplier to implement. The method allows the resulted frequency deviation to be smaller than the prior art and also allows a reduction in the implementation cost as compared to the prior art.

6 Claims, 2 Drawing Sheets

METHOD FOR GENERATING A CLOCK SIGNAL FOR UNIVERSAL ASYNCHRONOUS RECEIVER TRANSMITTER BY UTILIZING A PCI-STANDARDIZED CLOCK SIGNAL

CROSS-REFERENCE TO RELATED APPLICATION

This application claims the priority benefit of Taiwan application serial no. 88104318, filed Mar. 19, 1999, the full disclosure of which is incorporated herein by reference.

BACKGROUND OF THE INVENTION

1. Field of the Invention

This invention relates to computer technology, and more particularly, to a method for generating a clock signal for a UART (Universal Asynchronous Receiver-Transmitter) unit mounted on a PCI-compliant (Peripheral Component Interconnection) interface card.

2. Description of Related Art

A UART unit is a circuit module, typically incorporated in a single integrated circuit cuit chip, that includes both the receiving and transmitting circuits required for asynchronous nous serial communication between computer systems. It is typically incorporated in a modem and designed in accordance with established standards. Due to its asynchronous nature, a local clock generator is required to generate a clock signal for the timing of the transmitted and received signals. The clock generator can be internal or external to the UART unit. Some conventional types of UART units use an external crystal oscillator to generate a standardized 1.8432 MHz clock signal for the UART unit.

One drawback to the foregoing scheme, however, is that the use of the external crystal oscillator would considerably increase the manufacture cost since an additional input interface is required. By incorporating the clock generator inside the UART unit, it would also increase manufacture cost since it requires an increased layout area for the IC chip of the UART unit.

A conventional method that can generate a clock signal for UART unit having an ISA (Industry Standard Architecture) bus is to use the standardized 14.31818 MHz clock signal from the ISA bus in such a manner as to first multiply it by 4 and subsequently divide the resulted frequency by 31 to obtain an output frequency of 1.8475 MHz which is approximately close to the standardized 1.8432 MHz frequency to serve as the clock signal for the UART unit.

One drawback to the foregoing method, however, is that the resulted frequency is still quite large in deviation from the desired 1.8432 MHz. Moreover, it requires a frequency divider and a frequency multiplier to implement, which causes the implementation cost to be high. The implementation cost is even higher when a frequency multiplier with internal delay circuitry.

In conclusion, the prior art has two drawbacks. First, it requires the use of an external crystal oscillator to implement, which would increase manufacture cost. Second, in the case of using the standardized 14.31818 MHz clock signal from an ISA bus, it requires the use of a frequency multiplier, which would also increase manufacture cost and result in large frequency deviations.

SUMMARY OF THE INVENTION

This invention provides a method for generating a clock signal for a UART unit mounted on a PCI-compliant interface card, which can be implemented without using an external crystal oscillator, so that the manufacture cost of the UART unit can be reduced as compared to the prior art.

This invention provides a method for generating a clock signal for a UART unit mounted on a PCI-compliant interface card, which can utilize one of the PCI clock signals from the PCI local bus to generate a near-1.8432 MHz frequency with a smaller deviation from the standardized 1.8432 MHz to serve as the local clock signal for the UART unit.

In accordance with the foregoing and other objectives of this invention, the invention provides a method for generating a clock signal for a UART unit mounted on a PCI-compliant interface card. The PCI-compliant interface card is coupled to a PCI local bus, which supplys a PCI-standardized clock signal with a standardized frequency. In the method, a PCI-standardized clock signal is divided by an integer frequency divisor. The divided PCI-standardized clock signal is multiplied by an integer frequency multiplier. The divided PCI-standardized clock signal is changed to UART-demanded clock signal with a resulted frequency, which is substantially equal to a frequency which can be used for operation of the UART unit. The method of the invention can be implemented without having to use an external crystal oscillator or a frequency multiplier as in the case of the prior art. Moreover, the method of the invention can help result in a clock signal with a smaller frequency deviation from the standardized 1.8432 MHz than the prior art. The invention is therefore more advantageous to use than the prior art.

The method of the invention includes at first the PCI clock signal is divided by a predetermined integer frequency divisor. The resulted frequency from the division multiplied by a predetermined integer frequency multiplier that allows the resulted frequency to be substantially close to 1.8432 MHz to serve as the intended clock signal to the UART unit. Preferably, the integer frequency multiplier is in the range equal to or greater than 8. In one preferred embodiment, the integer frequency multiplier is 8 and the integer frequency divisor is 143 to render the 33 MHz PCI clock signal into a near-1.8432 MHz clock signal. In another preferred embodiment, the integer frequency multiplier is 32 and the integer frequency divisor is 573. The method of the invention can be implemented without having to use an external crystal oscillator or a frequency multiplier as in the case of the prior art. Moreover, the method of the invention can help result in a clock signal with a smaller frequency deviation from the standardized 1.8432 MHz than the prior art. The invention is therefore more advantageous to use than the prior art.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
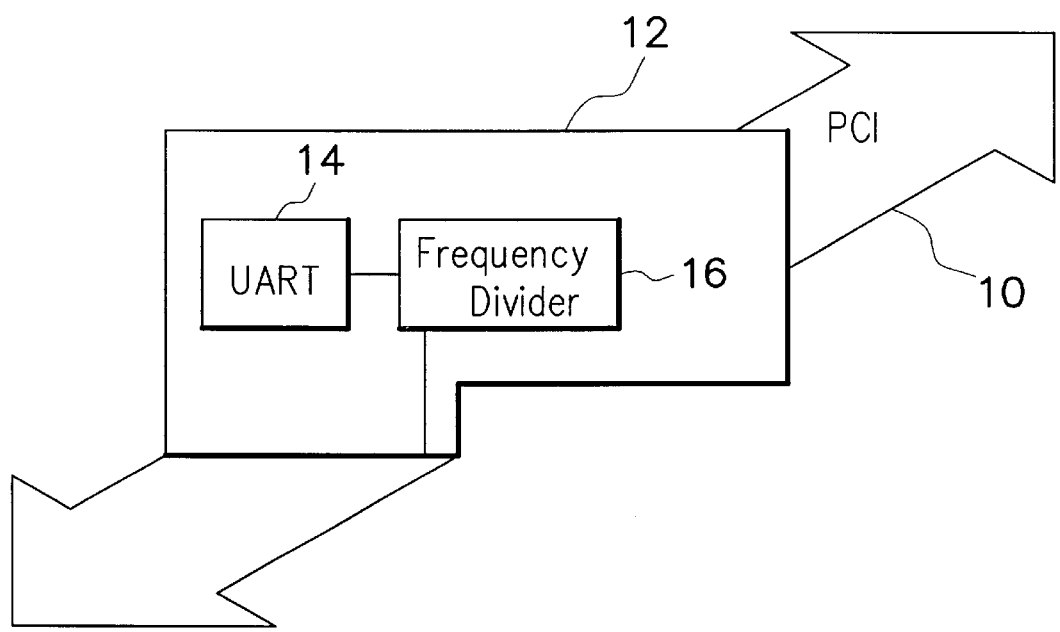
FIG. 1 is a schematic diagram of a PCI-compliant interface card on which the method of the invention is utilized for generating a clock signal for the UART unit mounted on the PCI-compliant interface card.

FIG. 1 is a schematic diagram of a PCI-compliant interface card 12 on which the method of the invention is utilized.

As shown, the PCI-compliant interface card 12 is coupled to a PCI local bus 10 and includes a UART unit 14 and a frequency divider 16. According to the PCI standard, the PCI local bus 10 can supply a PCI-standardized clock signal (hereinafter referred to as PCI clock signal throughout this specification) with a standardized frequency, such as 33 MHz or 66 MHz, to clock the PCI-compliant interface card 12. In accordance with the invention, the PCI clock signal is frequency-divided by the frequency divider 16 to obtain a clock signal with a UART-demanded frequency, for example, 1.8432 MHz, for normal operation of the UART unit 14.

In the following preferred embodiment, the PCI clock signal with 33 MHz is used to obtain the near-1.8432 MHz clock signal to the UART unit 14. In accordance with the invention, the PCI clock signal is first divided by a predetermined integer frequency divisor; and then the resulted frequency from the division is further multiplied by a predetermined integer frequency multiplier that allows the resulted frequency to be substantially close to the UART-demanded frequency, such as 1.8432 MHz, to serve as the intended clock signal to the UART unit 14. To allow easy design, the integer frequency multiplier is preferably a power of 2, such as 2, 4, 8, or 16. With the integer frequency multiplier being selected first, a corresponding integer frequency divisor can be then selected.

Table I shows the resulted frequencies and deviations thereof corresponding to 12 various combinations of selected frequency multipliers and divisors.

From Table I, it can be seen that Item #5 (M=8, D=143) provides a resulted frequency of 1846153.846 Hz with a deviation of −0.1603% from the standardized 1.8432 MHz; and Item #11 (M=32, D=573) provides a resulted frequency of 1842931.937 Hz with a deviation of 0.0145% from the standardized 1.8432 MHz. Therefore, these two combinations would be useable to provide a low-deviation near-1.8432 MHz to the UART unit 14.

Generally speaking, the method of the invention includes a first step of dividing one of the PCI clock signals, i.e., 33 MHz or 66 MHz, by a predetermined integer frequency divisor D; and a second step of multiplying the resulted frequency from the division by a predetermined integer frequency multiplier M to obtain an output frequency substantially close to 1.8432 MHz to serve as the desired clock signal for UART. The integer frequency multiplier M is preferably equal to or greater than 8 to allow the resulted frequency deviation to be minimum.

When implemented on the PCI-compliant interface card 12 of FIG. 1, the method of the invention is realized in such a manner as to use the frequency divider 16 to divide the 33 MHz PCI clock signal from the PCI local bus 10 by the factor D/M and then transfer the resulted frequency as the clock signal to the UART unit 14. In preferred embodiments, the combinations of multipliers and divisors (M=8, D=143) and (M=32, D=573) can be used. The ratio of the selected frequency divisor D to the selected frequency multiplier M, i.e., D/M, is then used to set the frequency divider 16 to divide the 33 MHz PCI clock signal from the PCI local bus 10 accordingly. The frequency divider 16 can be a digital type of circuit or an analog phase-locked loop circuit.

Table II shows the resulted data transfer rates and frequency deviations for various data transfer rate specifications in the case of using D/M=143/8 to obtain a near-1.8432 MHz frequency in comparison with the case of using a standardized 1.8432 MHz lock signal.

Moreover, Table III shows the resulted data transfer rates and frequency deviations for various data transfer rate specifications in the case of using D/M=143/8 and D/M=573/32 in accordance with the invention to obtain a near-1.8432 MHz frequency in comparison with the case of the prior art using D/M=31/4 and the case of using a standardized 1.8432 MHz lock signal.

It can be seen from Table II and Table III that, by using the invention, most of the resulted frequency deviations are approximately 0.16% in the case of using D/M=143/8 according to the invention, which is considerably better than 0.23% in the case of the prior art using D/M 31/4.

Figure 2:
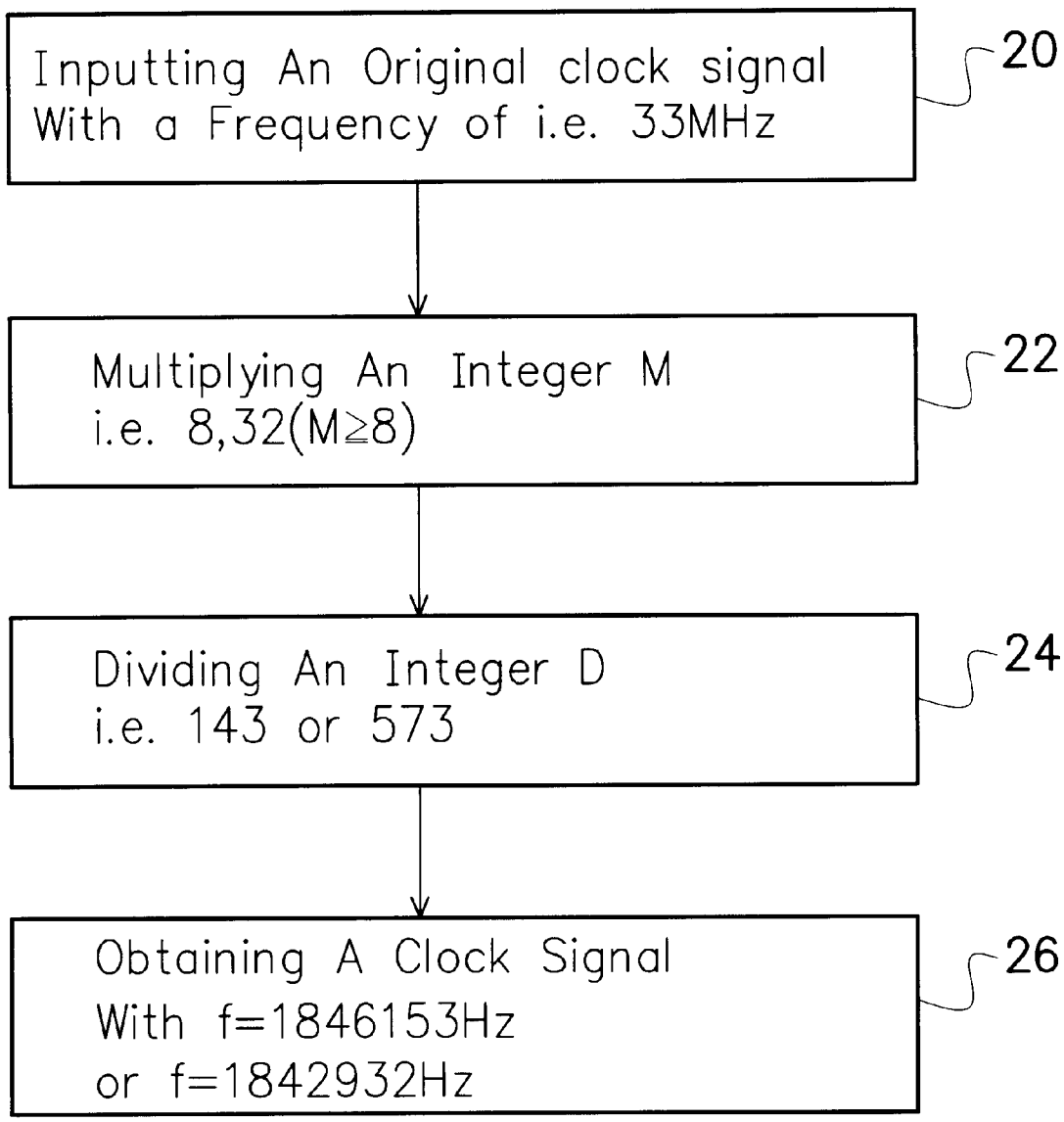
FIG. 2 is a process diagram, schematically illustrating the process to achieve the desired frequency of about 1.8432 MHz from an original frequency of 33 MHz, according to the preferred embodiment of the invention.

The process of the invention described above is illustrated in FIG. 2 as an example. Taking the original frequency of 33 MHz as an example, in step 20, the clock signal with a precise frequency of 33. MHz is input. In step 22, the 33 MHz is multiplied with an integer M, which is, for example, 8 or 32. Generally, M preferably is equal to or greater than 8. In step 24, the resulting clock signal from the step 22 is then divided by an integer D, which respectively, for example, is 143 or 573. Then, in step 26, a desired clock signal with a frequency of 1846153 Hz or 1842932 Hz is obtained. In FIG. 2, the step 22 and the step 24 actually can be reversed in order without affecting the resulting frequency.

In conclusion, the invention provides a method for generating a clock signal for a UART unit on a PCI-compliant interface card by dividing the PCI clock signal by a predetermined factor equal to the ratio of a selected integer frequency divisor to a selected integer frequency multiplier. The method of the invention can be implemented without having to use an external crystal oscillator or a frequency multiplier as in the case of the prior art. Moreover, the method of the invention can help result in a clock signal with a smaller frequency deviation from the standardized 1.8432 MHz than the prior art. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

TABLE I

| Item # | Frequency Multiplier | Frequency Divisor | Resulted Frequency (Hz) from 33 MHz | Deviation from 1.8432 MHz | |
|---|---|---|---|---|---|
| 1 | 4 | 71 | 1859154.930 | −0.8656% | |
| 2 | 4 | 72 | 1833333.333 | 0.5353% | |
| 3 | 4 | 73 | 1808219.178 | 1.8978% | |
| 4 | 8 | 142 | 1859154.930 | −0.8656% | |
| 5 | 8 | 143 | 1846153.846 | −0.1603% | ⇐ |
| 6 | 8 | 144 | 1833333.333 | 0.5353% | |
| 7 | 16 | 285 | 1852631.579 | −0.5117% | |
| 8 | 16 | 286 | 1846153.846 | −0.1603% | |
| 9 | 16 | 287 | 1839721.254 | 0.1887% | |
| 10 | 32 | 572 | 1846153.846 | −0.1603% | |
| 11 | 32 | 573 | 1842931.937 | 0.0145% | ⇐ |
| 12 | 32 | 574 | 1839721.254 | 0.1887% | |

TABLE II

| Transfer Rate spec. | UART's Internal Frequency Divisor | Resulted Transfer Rate Using D/M = 143/8 | Deviation in the case of D/M = 143/8 | Resulted Transfer Rate Using 1.8432 MHz | Deviation in the case of Using 1.8432 MHz |
|---|---|---|---|---|---|
| 50 | 2304 | 50.08012821 | 0.160% | 50.00027127 | −0.001% |
| 75 | 1536 | 75.12019231 | 0.160% | 75.0004069 | −0.001% |
| 110 | 1047 | 110.2049813 | 0.186% | 110.0292502 | −0.027% |
| 134.5 | 857 | 134.6378243 | 0.102% | 134.4231330 | 0.057% |
| 150 | 768 | 150.2403846 | 0.160% | 150.0008138 | −0.001% |
| 300 | 384 | 300.4807692 | 0.160% | 300.0016276 | −0.001% |
| 600 | 192 | 600.9615385 | 0.160% | 600.0032552 | −0.001% |
| 1200 | 96 | 1201.923077 | 0.160% | 1200.0065100 | −0.001% |
| 1800 | 64 | 1802.884615 | 0.160% | 1800.0097660 | −0.001% |
| 2000 | 58 | 1989.38992 | −0.531% | 1986.2176720 | 0.694% |
| 2400 | 48 | 2403.846154 | 0.160% | 2400.0130210 | −0.001% |
| 3600 | 32 | 3605.769231 | 0.160% | 3600.0195310 | −0.001% |
| 4800 | 24 | 4807.692308 | 0.160% | 4800.0260420 | −0.001% |
| 7200 | 16 | 7211.538462 | 0.160% | 7200.0390630 | −0.001% |
| 9600 | 12 | 9615.384615 | 0.160% | 9600.0520830 | −0.001% |
| 19200 | 6 | 19230.76923 | 0.160% | 19200.1041700 | −0.001% |
| 38400 | 3 | 38461.53846 | 0.160% | 38400.2083300 | −0.001% |
| 57600 | 2 | 57692.30769 | 0.160% | 57600.3152000 | −0.001% |
| 115200 | 1 | 115384.6154 | 0.160% | 115200.6250000 | −0.001% |

TABLE III

| Transfer Rate Spec. | UART's Internal Frequency Divisor | Frequency Deviation from using D/M = 143/8 to divide 33 MHz | Frequency Deviation from using D/M = 573/32 to divide 33 MHz | Frequency Deviation from using D/M = 31/4 to divide 14.31818 MHz (Prior Art) | Frequency Deviation from using the standardized 1.8432 MHz |
|---|---|---|---|---|---|
| 50 | 2304 | 0.160% | −0.015% | 0.23% | −0.001% |
| 75 | 1536 | 0.160% | −0.015% | 0.23% | −0.001% |
| 110 | 1047 | 0.186% | 0.012% | 0.26% | −0.027% |
| 134.5 | 857 | 0.102% | −0.072% | 0.175% | 0.057% |
| 150 | 768 | 0.160% | −0.015% | 0.23% | −0.001% |
| 300 | 384 | 0.160% | −0.015% | 0.23% | −0.001% |
| 600 | 192 | 0.160% | −0.015% | 0.23% | −0.001% |
| 1200 | 96 | 0.160% | −0.015% | 0.23% | −0.001% |
| 1800 | 64 | 0.160% | −0.015% | 0.23% | −0.001% |
| 2000 | 58 | −0.531% | −0.704% | 0.46% | 0.694% |
| 2400 | 48 | 0.160% | −0.015% | 0.23% | −0.001% |
| 3600 | 32 | 0.160% | −0.015% | 0.23% | −0.001% |
| 4800 | 24 | 0.160% | −0.015% | 0.23% | −0.001% |
| 7200 | 16 | 0.160% | −0.015% | 0.23% | −0.001% |
| 9600 | 12 | 0.160% | −0.015% | 0.23% | −0.001% |
| 19200 | 6 | 0.160% | −0.015% | 0.23% | −0.001% |
| 38400 | 3 | 0.160% | −0.015% | 0.23% | −0.001% |
| 57600 | 2 | 0.160% | −0.015% | 0.23% | −0.001% |
| 115200 | 1 | 0.160% | −0.015% | 0.23% | −0.001% |

What is claimed is:

1. A method for generating a clock signal for a UART unit mounted on a PIC-compliant interface card, the PCI-compliant interface card being coupled to a PCI local bus, the PCI local bus supplying a PCI-standardized clock signal with a standardized frequency, the method comprising:

dividing a PCI-standardized clock signal by an integer frequency divisor; and multiplying the divided PCI-standardized clock signal by an integer frequency multiplier, wherein the divided PCI-standardized clock signal is changed to UART-demanded clock signal with a resulted frequency, wherein the resulted frequency is substantially equal to a frequency which can be used for operation of the UART unit, wherein the integer frequency multiplier is in the range equal to or greater than 8.

2. The method of claim 1, wherein, in the case of the standardized frequency of the PCI-standardized clock signal being 33 MHz, the integer frequency multiplier is 8 and the integer frequency divisor is 143.

3. The method of claim 1, wherein, in the case of the standardized frequency of the PCI-standardized clock signal being 33 MHz, the integer frequency multiplier is 32 and the integer frequency divisor is 573.

4. A method for use on a PCI-compliant interface card having a UART unit and being coupled to a PCI local bus to generate a near-1.8432 MHz clock signal for clocking the UART unit, comprising the steps of:

dividing a selected PCI clock signal by a predetermined integer frequency divisor; and multiplying the resulted frequency from the division by a predetermined integer frequency multiplier that allows the resulted frequency to be substantially close to 1.8432 MHz to serve as the intended clock signal to the UART unit, wherein the integer frequency multiplier is in the range equal to or greater than 8.

5. The method of claim 4, wherein, in the case of the selected PCI clock signal being 33 MHz, the integer frequency multiplier is 8 and the integer frequency divisor is 143.

6. The method of claim 4, wherein, in the case of the selected PCI clock signal being 33 MHz, the integer frequency multiplier is 32 and the integer frequency divisor is 573.

* * * * *